(12) United States Patent
Caveney et al.

(10) Patent No.: US 9,908,464 B2
(45) Date of Patent: Mar. 6, 2018

(54) APPRISING A DRIVER OF CONFIDENCE IN OPERATION OF A VEHICLE

(71) Applicant: Toyota Motor Engineering & Manufacturing North America, Inc., Erlanger, KY (US)

(72) Inventors: Derek S. Caveney, Plymouth, MI (US); John-Michael McNew, Ann Arbor, MI (US); Heishiro Toyoda, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/095,121

(22) Filed: Apr. 10, 2016

(65) Prior Publication Data

US 2017/0291540 A1 Oct. 12, 2017

(51) Int. Cl.
| | |
|---|---|
| *G01C 22/00* | (2006.01) |
| *B60Q 5/00* | (2006.01) |
| *B60Q 9/00* | (2006.01) |
| *G05D 1/02* | (2006.01) |
| *G05D 1/00* | (2006.01) |

(52) U.S. Cl.
CPC ............ *B60Q 5/005* (2013.01); *B60Q 9/00* (2013.01); *G05D 1/0055* (2013.01); *G05D 1/021* (2013.01)

(58) Field of Classification Search
CPC .... B60Q 25/005; B60Q 29/00; G05D 1/0055; G05D 1/021; G05D 1/0061; G05D 1/2201; G05D 1/0212; G05D 1/0213; B60R 1/00; B60W 30/00

USPC ........ 701/22, 23, 12, 26, 411, 533; 340/439, 340/425.5, 426.11, 438, 901–903; 180/167, 168, 271
See application file for complete search history.

(56) References Cited

U.S. PATENT DOCUMENTS 8,031,085 B1 * 10/2011 Anderson ............. B60Q 5/008
340/425.5
8,135,507 B2 * 3/2012 Okabe ................... A61B 5/165
180/272

(Continued)

OTHER PUBLICATIONS

National Highway Safety Traffic Administration, "Prelminary Statement of Policy Concerning Automated Vehicles", Undated, (14 pages).

*Primary Examiner* — Shardul D Patel
(74) *Attorney, Agent, or Firm* — Christopher G. Darrow; Darrow Mustafa PC

(57) ABSTRACT

A vehicle subject to autonomous operation includes one or more autonomous support systems configured to support autonomous operation, a feedback system configured to provide feedback in an interior portion of the vehicle and a confidence appraisal system in communication with the one or more autonomous support systems and the feedback system. During autonomous operation, the confidence appraisal system monitors, based on operational statuses of the one or more autonomous support systems supporting the autonomous operation, confidence in the autonomous operation, and operates the feedback system to provide feedback in the interior portion of the vehicle. The feedback corresponds to the confidence in the autonomous operation, and varies with changes to the confidence in the autonomous operation, to continuously apprise a driver of the confidence in the autonomous operation.

22 Claims, 2 Drawing Sheets

(56) References Cited

U.S. PATENT DOCUMENTS

| | | | | |
|---|---|---|---|---|
| 8,718,861 B1* | 5/2014 | Montemerlo | ......... | B60W 30/00 701/26 |
| 2008/0024285 A1* | 1/2008 | Vandenbrink | ............ | B60Q 9/00 340/438 |
| 2011/0109462 A1* | 5/2011 | Deng | ..................... | G08B 21/06 340/575 |
| 2012/0242819 A1* | 9/2012 | Schamp | ................. | G08B 21/06 348/78 |
| 2013/0342339 A1* | 12/2013 | Kiefer | ...................... | G08B 6/00 340/438 |
| 2014/0132405 A1* | 5/2014 | Kiefer | .................. | B60W 50/14 340/438 |
| 2015/0175070 A1* | 6/2015 | Attard | ....................... | B60R 1/00 340/439 |

* cited by examiner

APPRISING A DRIVER OF CONFIDENCE IN OPERATION OF A VEHICLE

TECHNICAL FIELD

The present disclosure relates to vehicle alerts, and, more specifically, vehicle alerts in automated vehicles.

BACKGROUND

As vehicles become more automated, driver's awareness of the vehicle's operating conditions becomes increasingly more important. Many vehicles have alert systems. Such alert systems generally notify drivers and passengers when immediate action is needed from the driver, or a particular component or system is malfunctioning. The notifications issued by the alert system can be audible alerts, visual alerts, etc. However, such alert systems do not notify drivers and passengers when the system is operating in an ideal manner and no action from the driver is needed. Also, such alert systems do not notify drivers and passengers when the system is operating in a less-than ideal manner, yet still operable.

SUMMARY

Disclosed herein are embodiments of vehicles subject to autonomous operation with confidence appraisal systems and methods of apprising a driver of a confidence in autonomous operation of a vehicle. In one aspect, a vehicle subject to autonomous operation includes one or more autonomous support systems configured to support autonomous operation, a speaker system configured to disburse sound in an interior portion of the vehicle and a confidence appraisal system in communication with the one or more autonomous support systems and the speaker system. The confidence appraisal system includes a processor for initiating instructions stored on memory. The instructions include, during autonomous operation, monitoring, based on operational statuses of the one or more autonomous support systems supporting the autonomous operation, confidence in the autonomous operation, and operating the speaker system to disburse sound in the interior portion of the vehicle. The sound corresponds to the confidence in the autonomous operation, and varies with changes to the confidence in the autonomous operation, to continuously apprise a driver of the confidence in the autonomous operation.

In another aspect, a method of apprising a driver of a confidence in autonomous operation of a vehicle, includes, during autonomous operation of a vehicle is subject to autonomous operation, monitoring, based on operational statuses of one or more autonomous support systems supporting the autonomous operation, confidence in the autonomous operation, and operating a feedback system to provide feedback in an interior portion of the vehicle. The feedback corresponds to the confidence in the autonomous operation, and varies with changes to the confidence in the autonomous operation, to continuously apprise a driver of the confidence in the autonomous operation.

These and other aspects will be described in additional detail below.

DETAILED DESCRIPTION

Figure 1:
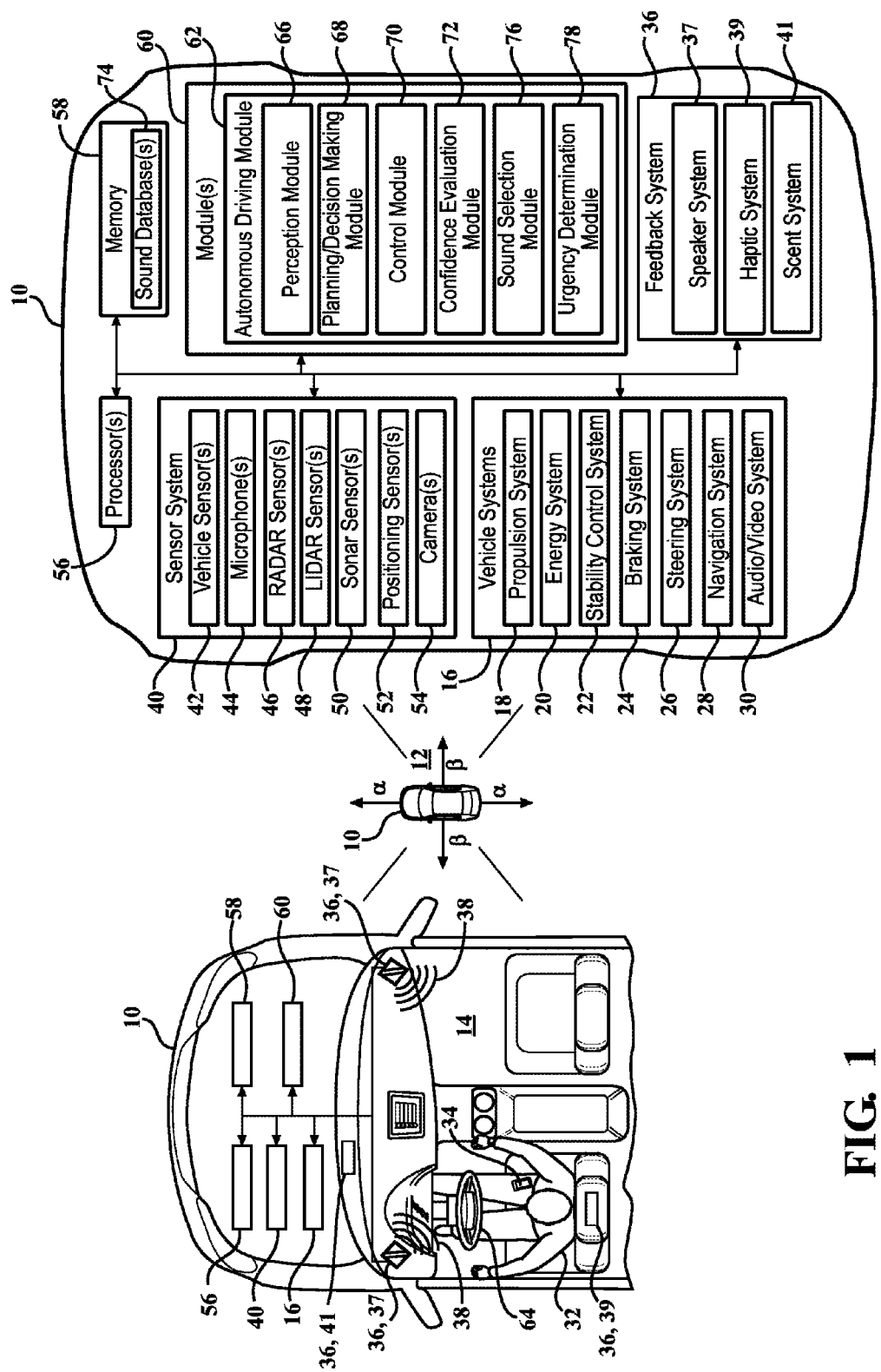
FIG. 1 is a view of a vehicle subject to autonomous operation, including a top view and schematic block diagram of the vehicle.

The present disclosure relates to systems and methods for apprising a driver of a vehicle subject to autonomous operation of confidence in the autonomous operation. While the vehicle is in autonomous operation, feedback is provided in the interior portion of the vehicle to continuously apprise the driver of the confidence in the autonomous operation. Generally speaking, the feedback corresponds to the confidence in the autonomous operation. At any given time, the feedback corresponds to the current confidence in the autonomous operation, and apprises the driver of the current confidence in the autonomous operation. Over time, the feedback varies with changes to the confidence in the autonomous operation to apprise the driver of the changes to the confidence in the autonomous operation.

Detailed examples are disclosed herein; however, it is to be understood that the disclosed examples are intended only to facilitate the description. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various examples are shown in FIGS. 1-2, but the examples are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the examples described herein can be practiced without these specific details.

Figure 2:
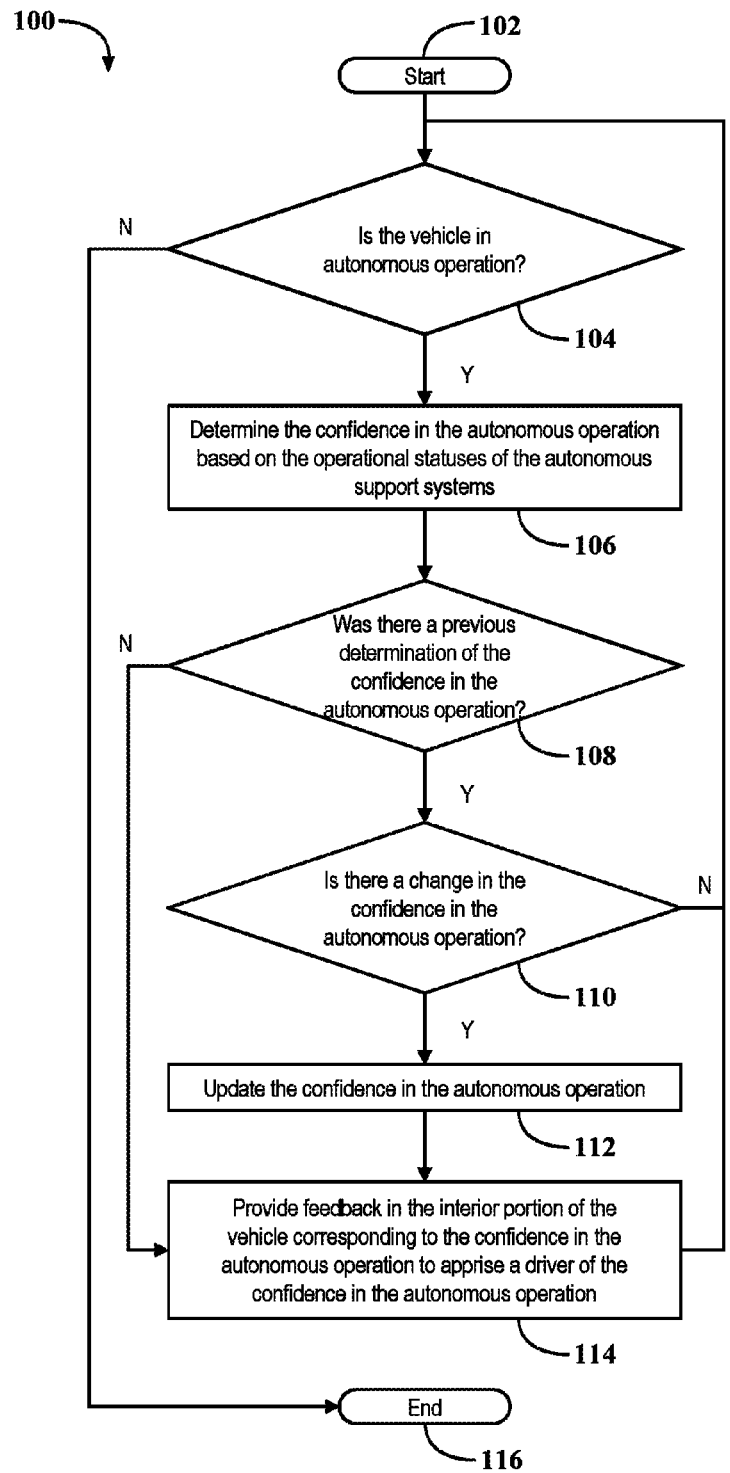
FIG. 2 is a flow chart showing a method of apprising a driver of a confidence in the autonomous operation.

FIG. 1 is a view of a vehicle 10. The view shows a top view of the vehicle 10, as well as a schematic block diagram of the vehicle 10. The vehicle 10 can be any type of vehicle. For example, the vehicle 10 can be an automobile, motorcycle, semi-truck, tractor, boat, and/or any other type of motorized or partially motorized transport. The vehicle 10 can be located in any environment. For example, the vehicle can have an external environment 12. The external environment 12 can be any region located outside the vehicle 10. Additionally, the vehicle 10 can have an interior portion 14. The interior portion 14 can generally be any region located inside the vehicle 10. In one or more arrangements, the interior portion 14 can include the cabin.

Generally speaking, the vehicle 10 is subject to autonomous operation. The vehicle 10 can be autonomous, semi-autonomous, and/or highly automated, for instance. The vehicle 10 can include various autonomous support systems that support the vehicle's 10 autonomous operation. These autonomous support systems may be or include various vehicle systems 16. The vehicle systems 16 can include, for example, a propulsion system 18, an energy system 20, a stability control system 22, a braking system 24, a steering system 26, a navigation system 28, an audio/video system 30, and/or any other systems generally available in vehicles (such as a climate control system, remote starting system, etc.). Each of the various vehicle systems 16 can have an operational status. The operational status for each of the various vehicle systems 16 can correspond to the operations of the vehicle systems 16, including without limitation their operability. The operational status can change over time as conditions effect the vehicle systems 16. Such conditions can include, for example, weather conditions, traffic conditions, low fuel or energy, etc.

The propulsion system 18 can control the engine, motor, transmission, and/or other vehicle controls (such as, for example, a cruise control system) for accelerating or maintaining the speed of the vehicle 10. The energy system 20 can control the vehicle's 10 energy usage and storage. The energy source used by the energy system 20 can be in the form of gasoline, natural gas, diesel oil, batteries, fuel cells, or the like. The stability control system 22 can activate brakes or motors to one or more of the vehicle's 10 wheels to maintain the stability of the vehicle 10, including, for example, the proper yaw of the vehicle 10. The braking system 24 can control the deceleration of the vehicle 10 by actuating, for example, breaks on the vehicle 10. The steering system 26 can control the direction of the vehicle 10 by adjusting, for example, the angle of the wheels with respect to a longitudinal direction $\alpha$, and/or lateral direction $\beta$. The navigation system 28 can be used for establishing routes or directions for the vehicle 10, and can include maps and/or can connect to external or remote sources for determining a route. The audio/video system 30 can be used for providing entertainment to a driver 32. The audio/video system 30 can receive data from various sources to provide entertainment to the driver 32. The audio/video system 30 can received data from remote sources, such as radio sources including AM radio, FM radio, satellite radio, etc. Additionally or alternatively, the audio/video system 30 can receive data from internal sources, such as CDs, DVDs. In one or more arrangements, the audio/video system 30 can receive data from the driver's 32 mobile device 34. The mobile device 34 can be wirelessly connected to the audio/video system 30.

The audio/video system 30 can be in communication with a speaker system 37 including one or more speakers. The speaker system 37 can be operated to disburse sound 38 in the interior portion 14 of the vehicle 10. The sound 38 may be disbursed, using sound from the audio/video system 30, for entertainment purposes.

The autonomous support systems of the vehicle 10 can further be or include a sensor system 40. The sensor system 40 can include one or more sensors. The one or more sensors can be configured to monitor something in the external environment 12 of the vehicle 10. In one or more arrangements, the one or more sensors can be configured to monitor in real-time. Real-time can be a level of processing responsiveness that a user or system senses as sufficiently immediate for a particular process or determination to be made, or that enables the processor to keep up with some external process. The sensor system 40 can be positioned anywhere in or on the vehicle 10. The sensor system 40 can at least partially include existing systems of the vehicle 10, such as backup sensors, lane keeping sensors, and/or front sensors, just to name a few possibilities.

Each of the sensors in the sensor system 40 can have an operational status. The operational status for each of the sensors in the sensors system 40 can correspond to the operations of the sensors, including without limitation with operability. The operational status can change over time as conditions effect the various sensors. Such conditions can include, for example, sensor failure, occlusion, vehicle location, low lighting conditions, state changes (e.g., ON/OFF) etc.

The sensor system 40 can include one or more sensors configured to sense the external environment 12 of the vehicle 10 or portions thereof. For instance, the sensor system 40 can be configured to acquire data of at least a forward portion and/or at least a rearward portion of the external environment 12 of the vehicle 10. For example, the sensor system 40 can monitor the forward portion along the longitudinal direction $\alpha$ in front of the vehicle 10, and/or monitor the rearward portion along the longitudinal direction $\alpha$ behind the vehicle 10.

Additionally or alternatively, the sensor system 40 can be configured to acquire data of at least a side portion of the external environment 12 of the vehicle 10. The side portion can be, for example, a portion of the external environment 12 that is located between the forward portion the rearward portion of the vehicle 10. For example, the sensor system 40 can be configured to monitor a left side and/or a right side portion along a lateral direction $\beta$ of the vehicle 10.

In one or more arrangements, the sensor system 40 can include vehicle sensors 42. Vehicle sensors 42 can include sensors associated with detecting information about the vehicle 10. Such information can include, for example, the vehicle's speed, direction, acceleration, rotation, weather conditions, traffic conditions, road conditions, etc. Sensors used in determining such information can include, for example, speedometers, gyroscopes, magnetometers, accelerometers, barometers, thermometers, altimeters, IMU sensors, CAN sensors, etc. Additionally or alternatively, the vehicle 10 can be in communication with external or remote sources for determining conditions, such as, for example, weather conditions, traffic conditions, road conditions, etc.

In one or more arrangements, the sensor system 40 can include microphone(s) 44. The microphone(s) 44 can be any component or group of components configured to detect sound waves. In one or more arrangements, the microphone(s) 44 can be configured to detect sound waves in the external environment 12 of the vehicle 10. Where the microphone(s) 44 are configured to detect sound waves in the external environment 12, the microphone(s) 44 can be at least partially exposed to the external environment 12. Additionally or alternatively, the microphone(s) 44 can be configured to detect sound waves in the interior portion 14 of the vehicle 10. Where the microphone(s) 44 are configured to detect sound waves in the interior portion 14, the microphone(s) 44 can be at least partially exposed to the interior portion 14.

In one or more arrangements, the sensor system 40 can include radar sensor(s) 46. The radar sensor(s) 46 can be any device, component and/or system that can detect something using at least in part radio signals. The radar sensor(s) 46 can be configured to detect the presence of one or more objects in the external environment 12 of the vehicle 10, the position of each detected object relative to the vehicle 10, the distance between each detected object and the vehicle 10 in one or more directions (e.g., in the longitudinal direction $\alpha$, the lateral direction $\beta$ and/or other direction(s)), the elevation of each detected object, the speed of each detected object, and/or the movement of each detected object. The radar sensor(s) 46, or data obtained thereby, can determine or be used to determine the speed, position, and/or orientation of objects in the external environment 12 of the vehicle 10. The radar sensor(s) 46 can have three dimensional coordinate data associated with the objects.

In one or more arrangements, the sensor system 40 can include LIDAR sensor(s) 48. The LIDAR sensor(s) 48 can be any device, component and/or system that can detect something using at least in part electromagnetic signals. In one or more arrangements, the electromagnetic signals can be laser signals. The LIDAR sensor(s) 48 can include a laser source and/or laser scanner configured to emit a laser signal and a detector configured to detect reflections of the laser signal. The LIDAR sensor(s) 48 may be configured to operate in a coherent or an incoherent detection mode. The LIDAR sensor(s) 48 can be configured to detect the presence of one or more objects in the external environment of the vehicle 10, the position of each detected object relative to the vehicle 10, the distance between each detected object and the vehicle 10 in one or more directions, the elevation of each detected object, the speed of each detected object, and/or the movement of each detected object.

In one or more arrangements, the sensor system 40 can include sonar sensor(s) 50. The sonar sensor(s) 50 can be any device, component and/or system that can detect something using at least in part sound waves. The sonar sensor(s) 50 can be configured to detect the presence of one or more objects in the external environment 12 of the vehicle 10, the position of each detected object relative to the vehicle 10, the distance between each detected object and the vehicle 10 in one or more directions (e.g., in the longitudinal direction α, the lateral direction β and/or other direction(s)), the elevation of each detected object, the speed of each detected object, and/or the movement of each detected object. The sonar sensor(s) 50, or data obtained thereby, can determine or be used to determine the speed, position, and/or orientation of objects in the external environment 12 of the vehicle 10.

In one or more arrangements, the sensor system 40 can include positioning sensor(s) 52. The positioning sensor(s) 52 can include a global positioning system, a local positioning system, and/or a geolocation system. The positioning sensor(s) 52 may include a transceiver configured to estimate a position of the vehicle 10 with respect to the Earth. For example, positioning sensor(s) 52 can include a GPS transceiver to determine the vehicle's latitude, longitude and/or altitude. The positioning sensor(s) 52 can use other systems (e.g., laser-based localization systems, inertial-aided GPS, and/or camera-based localization) to determine the location of the vehicle 10. It should understood that many various systems or components can be substituted and/or supplemented to the positioning sensor(s) 52 to determine the location of the vehicle 10 without departing from the scope of this disclosure.

In one or more arrangements, the sensor system 40 can include camera(s) 54. The camera(s) 54 can be any device, component, and/or system that can capture visual data. The visual data can include video and/or image information/data. The visual data can be in any suitable form. In one or more arrangements, visual data can include heat signatures, thermal images, and/or thermal video of a portion of the external environment 12 of the vehicle 10.

The camera(s) 54 can be any suitable type of camera. For instance, the camera(s) 54 can be high resolution cameras, high dynamic range (HDR) cameras, infrared (IR) cameras, and/or thermal imaging cameras.

In one or more arrangements, camera(s) 54 can be positioned to capture visual data from at least a portion of the external environment 12 of the vehicle 10. In one or more arrangements, camera(s) 54 can be positioned to capture visual data from at least a rearward portion of the external environment of the vehicle 10. As a further example, camera(s) 54 can be positioned to acquire visual data from at least a left side portion and/or a right side portion of the external environment of the vehicle 10.

The camera(s) 54 can be located in any suitable portion of the vehicle 10. For instance, camera(s) 54 can be located within the vehicle 10. One or more of the camera(s) 54 can be located on the exterior of the vehicle 10. One or more of the camera(s) 54 can be located on or exposed to the exterior of the vehicle 10. Additionally or alternatively, one or more of the camera(s) 54 can be located in on a side of the vehicle 10. As another example, one or more of the camera(s) 54 can be located on the roof of the vehicle 10.

In one or more arrangements, the camera(s) 54 can be one or more backup cameras. The backup camera can be a camera configured to acquire visual data of a rearward portion of the external environment 12 of the vehicle 10. In some arrangements, the one or more backup cameras can capture visual data of at least a portion of the rearward portion of the external environment when the vehicle 10 is not in a reverse gear mode and/or is otherwise moving in reverse. Alternatively or in addition, the camera(s) 54 can include other cameras that may be used in the vehicle 10.

The vehicle 10 can include one or more processor(s) 56. The processor(s) 56 can be any component or group of components that are configured to execute any of the processes described herein or any form of instructions to carry out such processes or cause such processes to be performed. The processor(s) 56 can be implemented with one or more general-purpose and/or special-purpose processors. Examples of suitable processor(s) 56 can include microprocessors, microcontrollers, digital signal processors, and other circuitry that can execute software. Further examples of suitable processor(s) 56 include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 56 can include at least one hardware circuit (e.g., an integrated circuit) configured to carry out instructions contained in program code. In arrangements in which there is a plurality of processor(s) 56, such processors can work independently from each other or one or more processors can work in combination with each other. In one or more arrangements, the processor(s) 56 can be a main processor of the vehicle 10. For instance, the processor(s) 56 can be an electronic control unit (ECU).

The vehicle 10 can include computer readable medium. In one or more arrangements, the computer readable medium can be memory 58. The memory 58 can include volatile and/or non-volatile memory. Examples of suitable memory 58 includes RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory 58 can include instructions in program code stored thereon. Such instructions can be executed by the processor(s) 56, and/or one or more modules of the vehicle 10. In one or more arrangements, the memory 58 can be a component of the processor(s) 56. In one or more arrangements, the memory 58 can be operatively connected to the processor(s) 56, and/or one or more modules of the vehicle 10 and used thereby. Operatively connected can include direct or indirect connections, including connections without direct physical contact.

The vehicle 10 can include one or more module(s) 60. The module(s) 60 can be for performing various tasks in the vehicle 10. The module(s) 60 can be implemented as computer readable program code that, when executed by the processor(s) 56, implement one or more of the various processes described herein. Such computer readable program code can be stored on the memory 58. The module(s) 60 can be a component of the processor(s) 56, or the module(s) 60 can be executed on and/or distributed among other processing systems to which the processor(s) 56 are operatively connected. The module(s) 60 can include instructions (e.g., program logic) executable by the processor(s) 56. Additionally or alternatively, the memory 58 can contain such instructions. The various module(s) 60 can be operatively connected to the processor(s) 56, the sensor system 40, the vehicle systems 16, the memory 58, and/or any other system or components of the vehicle 10. Operatively connected, as used herein, includes direct and indirect connections, including connections spread out over long distances and wireless connections. Various examples of module(s) 60 that the vehicle 10 can include will be described herein.

The vehicle 10 can include an autonomous driving module 62. The autonomous driving module 62 can be any component or group of components configured to operate the vehicle 10 without driver control. In one or more arrangements, the autonomous driving module 62 can operate the vehicle 10 according to various levels of automation. The various levels of automation can, for example, range from LEVEL 0 through LEVEL 4. LEVEL 0 can be no automation. LEVEL 1 can be function-specific automation, where the vehicle controls specific vehicle functions independently. For example, the vehicle 10 can have adaptive cruise control, electronic stability control, dynamic braking, etc. In LEVEL 1, the driver has overall control with hands on a steering wheel 64 and feet on the pedals, but cedes control of some functions to the vehicle 10. In LEVEL 2, the vehicle 10 can have control of two or more functions that work in unison to relieve the driver of some control. One example of LEVEL 2 control would be a vehicle 10 having both lane centering and adaptive cruise control. In that example, distinguishing between LEVEL 1 and LEVEL 2, the driver is able to take his hands off the steering wheel 64 and off the pedal at the same time. In LEVEL 3, the vehicle 10 can have limited self-driving automation. LEVEL 3 allows a driver to cede full control of all functions under certain traffic or environmental conditions. In LEVEL 4, the vehicle 10 is fully autonomous. The vehicle 10 has full control of all functions in all traffic and environmental conditions. These levels of automation are outlined by the National Highway Traffic Safety Administration publication, titled "Preliminary Statement of Policy Concerning Automated Vehicles," (hereinafter NHTSA publication) which is incorporated herein by reference. Although these levels are described in this example, many different variations of such levels, including different levels of automation, can be used.

The autonomous driving module 62 can cause the vehicle 10 to operate in a current state of autonomy. The current state of autonomy can, for example, correspond to the current level of automation the vehicle 10 is capable of operating in. In this and other examples, the current state of autonomy can be selected by the driver 32 based on his or her current preferences. The current state of autonomy can be selected, for example, by the driver 32 selecting a button or switch on a user interface.

The autonomous driving module 62 can be operatively connected to the various autonomous support systems, including the vehicle systems 16 and the sensor system 40. The autonomous driving module 62 can, for example, use data received from the sensor system 40 to control the various vehicle systems 16.

The autonomous driving module 62 can include various sub-modules. The various sub-modules can be a part of the autonomous driving module 62, and/or can be modules outside of and in communication with the autonomous driving module 62.

The autonomous driving module 62 can include a perception module 66. The perception module 66 can evaluate the vehicle's 10 environment 12. The perception module 66 can receive data from the sensor system 40. The perception module 66 can evaluate data received from the sensor system 40 monitoring the external environment 12 of the vehicle 10. Based on the data detected by the sensor system 40, the perception module 66 can determine the conditions present in the external environment 12 of the vehicle 10, including, for example, surrounding vehicles, pedestrians, construction zones, trees and foliage, and other objects or conditions generally perceived along a roadway.

The autonomous driving module 62 can include a planning/decision making module 68. The planning/decision making module 68 can be in communication with the perception module 66. Based on the conditions present in the external environment 12 of the vehicle 10 (as determined by the perception module 66), the planning/decision making module 68 can plan a path that takes into consideration the conditions present.

The autonomous driving module 62 can include a control module 70. The control module 70 can control the various vehicle systems 16 to operate the vehicle 10 based on the path determined by the planning/decision making module 68. The control module 70 can send signals directly to the various vehicle systems 16. Additionally or alternatively, the control module 70 can send signals to actuators that control components of the vehicle 10 that are included in the various vehicle systems 16.

It should be appreciated that, although the previous example of an autonomous driving module 62 is described, the vehicle 10 can be operated autonomously or semi-autonomously by many different methods. Accordingly, the present disclosure should not be limited to this autonomous driving module 62, and should be understood to generally include variations of autonomous systems for controlling a vehicle 10.

The vehicle 10 can include a confidence evaluation module 72. The confidence evaluation module 72 can determine confidence in the autonomous operation of the vehicle 10. The confidence may be associated with or otherwise based on the operational statuses of the autonomous support systems supporting the autonomous operation, such as the vehicle systems 16 and/or the sensors in the sensor system 40. If any one of the vehicle systems 16 or any sensors in the sensor system 40 are not operating optimally, or are in a failed state, the confidence in the autonomous operation can be lower than if they were operating optimally, for example. The confidence level can be a scaled number, a percentage confidence, a weighted factor, or any other way of characterizing confidence in autonomous operation.

For example, if the vehicle 10 is in a location where positioning sensors 52 are not performing optimally, the confidence evaluation module 72 can evaluate the current operational status of the positioning sensor(s) 52, determine that the positioning sensor(s) 52 are not operating optimally, and determine the confidence in the autonomous operation considering that the positioning sensor(s) 52 are not operating optimally.

It is noted that, although the confidence in the autonomous operation may be adjusted based on a sensor in the sensor system 40, a vehicle system 16 or other autonomous support system not operating optimally, it may be the case that the vehicle 10 can still operate autonomously, either in its current or different state of autonomy, albeit in a less confident manner.

In one or more arrangements, the confidence evaluation module 72 can identify the current state of autonomy that the vehicle 10 is operating in. As stated, the current state of autonomy can be a state of autonomy that the driver 32 selects. Additionally or alternatively, the current state of autonomy can be the maximum level of automation which the vehicle 10 is currently capable of operating in.

The confidence evaluation module 72 can make determinations of confidence in the autonomous operation of the vehicle 10. The confidence evaluation module 72 can, for instance, make determinations of confidence in the current state of autonomy. The confidence, as determined by the confidence evaluation module 72, can be based on the operational statuses of any combination of one or more of the sensors in the sensor system 40, one or more of the various vehicle systems 16 or other autonomous support systems supporting autonomous operation of the vehicle 10. Accordingly, the confidence, as determined by the confidence evaluation module 72, can be based on the operability of the autonomous support systems. Additionally or alternatively, the confidence can be based on other information from the autonomous support systems, such as the vehicle's 10 location, traffic or construction conditions, etc. In this example, the vehicle 10 can predict a future condition that may cause a change in the current state of autonomy, for instance.

The vehicle 10 can include a confidence appraisal system in communication with the autonomous support systems and a feedback system 36. The confidence appraisal system can be or include one or more modules working in unison to apprise a driver of confidence in the autonomous operation of the vehicle 10. The feedback system 36 can include, for example, the speaker system 37, a haptic system 39, and a scent system 41. Accordingly, the feedback system 36 can disburse or otherwise provide feedback in the interior portion 14 of the vehicle 10. The feedback provided in the interior portion 14 of the vehicle 10 can include sound, haptic feedback, a scent, and/or any combination of these examples provided. The feedback system 36 generally provides feedback to the driver to continuously apprise the driver of the confidence in autonomous operation of the vehicle 10, while the vehicle 10 is subject to autonomous operation.

In one example, the feedback can be sound 38 disbursed in the interior portion 14 of the vehicle 10. While the vehicle 10 is in autonomous operation, sound 38 is disbursed in the interior portion 14 of the vehicle 10 to continuously apprise the driver of the confidence in the autonomous operation. Generally speaking, the sound 38 corresponds to the confidence in the autonomous operation. At any given time, the sound 38 corresponds to the current confidence in the autonomous operation, and apprises the driver of the current confidence in the autonomous operation. Over time, the sound 38 varies with changes to the confidence in the autonomous operation to apprise the driver of the changes to the confidence in the autonomous operation.

The vehicle 10 can include one or more databases for storing one or more types of data. The one or more databases can be a component of the memory 58, the processor(s) 56, or the database(s) can be operatively connected to the processor(s) 56 and/or memory 58 for use thereby. In one or more arrangements, the database(s) can be stored at a remote location and accessed wirelessly by the vehicle 10.

In examples where the feedback includes at least sound, the memory 58 can include sound database 74. The sound database 74 can include one or more sounds. The sounds, for example, may represent corresponding sounds 38 that can be disbursed by the speaker system 37 in the interior portion 14 of the vehicle 10.

The vehicle 10 can include a selection module. In examples where the feedback includes at least sound, the selection module can be a sound selection module 76. While the vehicle 10 is in autonomous operation, the sound selection module 76 can select, based on the confidence in the autonomous operation as determined by the confidence evaluation module 72, a sound that corresponds to the confidence. The sound selection module 76 can operate the speakers 37 to disburse the selected sound as sound 38 in the interior portion 14 of the vehicle 10 to apprise the driver 32 of the confidence. At any given time, the selected sound corresponds to the current confidence and, when disbursed as sound 38, apprises the driver 32 of the current confidence. Over time, the selected sounds, and therefore the sound 38, will vary with changes to the confidence to apprise the driver 32 of the changes to the confidence. It is noted that, although this example provided is in relation to sound, the same or similar description could apply to other modules for selecting other forms of feedback (e.g., signal selection module, scent selection module, etc., as discussed below).

Generally speaking, a sound can include a temporal string of tones. Together, the sound's tones may express music (e.g., a song or other composition), road noise (e.g., noise heard as a vehicle drives along a roadway, including traffic sounds, construction sounds, etc.) or white noise, for example, or any combination of these. In these and other examples, the sound's tones may have a plurality of characteristics subject to variation, and one, some or all of these characteristics may be varied to vary the sound's intensity. The sound's tones may be varied using, for example, sound manipulation software generally known in the art.

These characteristics of the sound's tones may be or include pitch, loudness and tempo, and to vary the sound's intensity, one, some of all of these characteristics of its tones may be varied, for example. The sound's intensity may increase with increases to the pitch, loudness or tempo of the sound's tones, or any combination of these, for instance. On the other hand, the sound's intensity may decrease with decreases to the pitch, loudness or tempo of the sound's tones, or any combination of these, for instance. It will be understood that the variations in these characteristics of the sound's tones may be accompanied by variations in other characteristics of the sound or its tones, such as, amplitude, timbre, harmony, octave, melody or phase, for instance, or any combination of these.

The sound selection module 76 can select a sound that has an intensity that corresponds to the confidence in the autonomous operation, and operate the speakers 37 to disburse the selected sound as sound 38 in the interior portion 14 of the vehicle 10 to apprise the driver 32 of the confidence. Over time, the intensity of the selected sounds, and therefore the intensity of the sound 38, will vary with changes to the confidence to apprise the driver of the changes to the confidence. In implementation, the sound 38 may implicitly apprise the driver 32 of the confidence in the autonomous operation. In other words, the sound 38 may apprise the driver 32 of the confidence in the autonomous operation without specifically saying, or instructing, what the current confidence in the autonomous operation is, or that the confidence in the autonomous operation is changing.

Under the sound selected by the sound selection module 76, and its operation of the speaker system 37, the intensity of the sound 38 disbursed in the interior portion 14 of the vehicle 10 can, for example, increase with decreases to the confidence, and decrease with increases to the confidence.

In one implementation where the tones of the sound 38 have a plurality of characteristics subject to variation, to vary the intensity of the sound 38, one or more characteristics of its tones may be varied, with one or more remaining characteristics of its tones staying the same. For example, to vary the intensity of the sound 38, one or more of the pitch, loudness or tempo of the tones of the sound 38 could be varied, with the one or more remaining characteristics of its tones staying the same. Accordingly, although the sound 38 may be adjusted, with one or more of the pitch, loudness or tempo of its tones varied to vary the intensity of the sound 38, the sound 38 may otherwise stay the same. In cases where the tones of the sound 38 express music, road noise or white noise, for example, the music, road noise or white noise, as the case may be, may be adjusted to vary its intensity, but otherwise stay the same.

In this implementation, to increase the intensity of the sound 38, the sound 38 could be adjusted so the pitch of its tones is increased, with the sound 38 otherwise staying the same, for instance. Or, for instance, the sound 38 could be adjusted so the loudness of its tones is increased, with the sound 38 otherwise staying the same. Or, for instance, the sound 38 could be adjusted so the tempo of its tones is increased, with the sound 38 otherwise staying the same.

On the other hand, in this implementation, to decrease the intensity of the sound 38, the sound 38 could be adjusted so the pitch of its tones is decreased, with the sound 38 otherwise staying the same, for instance. Or, for instance, the sound 38 could be adjusted so the loudness of its tones is decreased, with the sound 38 otherwise staying the same. Or, for instance, the sound 38 could be adjusted so the tempo of its tones is decreased, with the sound 38 otherwise staying the same.

In another implementation where the tones of the sound 38 have a plurality of characteristics subject to variation, to vary the intensity of the sound 38, each characteristic of its tones may be varied. For example, to vary the intensity of the sound 38, each of the pitch, loudness or tempo of the tones of the sound 38 could be varied. Accordingly, the sound 38 may be entirely switched. In cases where the tones of the sound 38 express music, road noise or white noise, for example, the music, road noise or white noise, as the case may be, may be switched to something with a varied intensity. In this implementation, to increase the intensity of the sound 38, one, some or all of the pitch, loudness or tempo of the tones of the sound 38 may be increased, for instance. On the other hand, in this implementation, to decrease the intensity of the sound 38, one, some or all of the pitch, loudness or tempo of the tones of the sound 38 may be decreased.

A given sound selected by the sound selection module 76 may be sourced from the sound database 74, from sounds detected by the microphone 44 or from the audio/video system 30, for example, or any combination of these.

In one or more arrangements, the sound selection module 76 can select sounds from the sound database 74. For this purpose, the sound database 74 can store different sounds having respective intensities that, when selected by the sound selection module 76 and disbursed back-to-back as sound 38, result in the sound 38 having a varying intensity. In this example, the sounds stored on the sound database 74 can be indexed, classified or otherwise arranged based on their intensity. Otherwise, one sound stored on the sound database 74 could be subject to having its intensity varied by the sound selection module 76 so that, when it is disbursed as sound 38, the sound 38 has a varying intensity. In this case, the sound 38 could be adjusted, with one or more of the pitch, loudness or tempo of its tones varied to vary the intensity of the sound 38, with the sound 38 otherwise staying the same.

In one or more arrangements, the sound selection module 76 can select a sound detected by the microphone(s) 44. The microphone(s) 44 can detect sound in the external environment 12 of the vehicle 10, such as road noise, or other ambient noise in, around or otherwise associated with the vehicle 10. The detected sound can be subject to having its intensity varied by the sound selection module 76 so that, when it is disbursed as sound 38, the sound 38 has a varying intensity. In this case, the sound 38 could be adjusted, with one or more of the pitch, loudness or tempo of its tones varied to vary the intensity of the sound 38, with the sound 38 otherwise staying the same.

In one or more arrangements, the sound selection module 76 can select sounds currently received by the audio/video system 30. The sound received by the audio/video system 30 can be subject to having its intensity varied by the sound selection module 76 so that, when it is disbursed as sound 38, the sound 38 has a varying intensity. In this case, the sound 38 could be adjusted, with one or more of the pitch, loudness or tempo of its tones varied to vary the intensity of the sound 38, with the sound 38 otherwise staying the same.

The sound 38 can be varied continuously with changes to the confidence. Additionally or alternatively, the sound 38 can be varied in a piece-wise manner as the confidence transitions through certain threshold values or intervals.

The vehicle 10 can include an urgency determination module 78. While the vehicle 10 is in autonomous operation, the urgency determination module 78 can monitor the confidence in the autonomous operation determined by the confidence evaluation module 72. The urgency determination module 78 can detect changes to the confidence over time. When, for instance, a drop in the confidence is significant, the urgency determination module 78 can determine that it is necessary to apprise the driver 32 of the confidence in a more urgent manner. On the other hand, when a rise in the confidence is significant, the urgency determination module 78 can determine that the driver 32 can be apprised of the confidence in a less urgent manner. In these cases, the urgency determination module 78 can communicate with the sound selection module 76 to select more or less intense sounds based on the urgency, which, in turn, is based on the change in confidence over time.

The urgency determination module 78 can also compare the confidence to a threshold confidence. In one or more arrangements, each state of autonomy can have a threshold confidence associated therewith. Additionally or alternatively, the vehicle 10 can have an overall threshold confidence regardless of the state of autonomy. When the confidence is not within the threshold, the urgency determination module 78 can cause the vehicle 10 to change from its current state of autonomy to a new state of autonomy.

Additionally or alternatively, the urgency determination module 78 can alert the driver 32 to a change from the current state of autonomy to a new state of autonomy. In these examples, the urgency determination module 78 can apprise the driver 32 of a forthcoming state change of autonomy (or to manually change) the current state of autonomy to a new state of autonomy. In this example, the urgency determination module 78 can operate the speaker system 37 to disburse another sound in the interior portion 14 of the vehicle 10, can communicate with the audio/video system 30 to display a message on a display, actuate a light, etc.

In another example, the feedback provided in the interior portion 14 can include, at least, haptic feedback via the haptic system 39. While the vehicle 10 is in autonomous operation, haptic feedback is provided to the driver in the interior portion 14 of the vehicle 10 to continuously apprise the driver of the confidence in the autonomous operation. Generally speaking, the haptic feedback corresponds to the confidence in the autonomous operation. At any given time, the haptic feedback corresponds to the current confidence in the autonomous operation, and apprises the driver of the current confidence in the autonomous operation. Over time, the haptic feedback varies with changes to the confidence in the autonomous operation to apprise the driver of the changes to the confidence in the autonomous operation.

As shown in FIG. 1, the haptic system 39 can be positioned in, for example, the driver's seat. However, such a system can be incorporated in other areas of the interior portion 14 of the vehicle 10, such as the steering wheel, the floorboard near the driver's feet, etc. The haptic system 39 can be in communication with the confidence evaluation module 72 and the urgency determination module 78.

In this example, the sound selection module 76 can be replaced with or include a signal selection module. The signal selection module can, for example, select and/or generate a signal to transmit to the haptic system 39. The signal can, for example, be a pulse width modulated signal. Various signals can be generated or selected via the signal selection module based on their corresponding intensity when disbursed via the haptic system 39. Much like the sounds previously described, the haptic system 39 can be operated during autonomous operation of the vehicle 10 to continuously apprise the driver of the current confidence in autonomous operation of the vehicle 10.

The signals received by the haptic system 39 can have varying intensities, similar to the varying intensities of sound previously described. For example, the signals received by the haptic system 39 can change over time based on changes in confidence. The signals received by the haptic system 39 can have an intensity that changes over time based on the changes in confidence as detected by the confidence evaluation module 72. The intensity can be reflected in the signal. The signal can be varied by varying, for example, any one or more of the amplitude of the signal, the frequency of the signal, the voltage of the signal, the pulse-width of the signal, etc., depending on the type of the haptic system 39.

In another example, the feedback provided in the interior portion 14 can include, at least, a scent disbursed in the interior portion 14 of the vehicle 10. While the vehicle 10 is in autonomous operation, a scent is disbursed or provided to the interior portion 14 of the vehicle 10 to continuously apprise the driver of the confidence in the autonomous operation. Generally speaking, the scent corresponds to the confidence in the autonomous operation. At any given time, the scent corresponds to the current confidence in the autonomous operation, and apprises the driver of the current confidence in the autonomous operation. Over time, the scent varies with changes to the confidence in the autonomous operation to apprise the driver of the changes to the confidence in the autonomous operation.

The scent system 41 can be positioned anywhere in the interior portion 14 of the vehicle 10. The scent system 41 can be in communication with the confidence evaluation module 72 and the urgency determination module 78. The scent system 41 can include one or more scents. The scent system 41 can change the intensity of the scent in the interior portion 14 of the vehicle 10 over time. The intensity of the scent can change over time as the confidence in autonomous operation of the vehicle 10 changes. Accordingly, in general, the scent in the interior portion 14 of the vehicle 10 can reflect the current confidence in autonomous operation while the vehicle 10 is subject to autonomous operation.

In one example, the intensity of the scent can be based on the perceived strength of the odor sensation (as perceived by a driver). In this example, the scent remains the same over time, and the concentration of the scent changes with changes in the confidence. The concentration based on the perceived strength of the odor sensation can include, for example, very weak, weak, distinct, strong, very strong, intolerable, etc.

Additionally or alternatively, the intensity can be based on a classification of each of the scents included in the scent system 41. The classifications can include, for example, sweet, warm, sour, pungent, etc. In this example, the scent changes over time, based on changes in confidence. Each of the scents included in the scent system 41 can have a corresponding classification. In one example, the driver can classify the different scents. For example, the scent system can disburse each of the scents for the driver to sample, and the driver can input a corresponding classification based on his or her own personal preferences. As such, each scent included on the scent system 41 would have a corresponding subjectively classified intensity based on a driver's input, after sampling. Additionally or alternatively, each scent included on the scent system 41 could be classified by their generally understood intensity. For example, certain flowers, such as roses, are generally understood to have a good scent. Alternatively, sewage is generally understood to have a bad scent.

In this example, the actual scent disbursed can be changed (similar to changing the sound 38 disbursed), and/or the concentration of the scent can be changed. For example, a more concentrated scent can be disbursed with changes in confidence. The concentration of the scent can increase as confidence decreases, and the concentration of the scent can decrease as confidence increases. Additionally or alternatively, the scent disbursed in the interior portion 14 of the vehicle 10 can change with changes in confidence. The intensity of the scent can be changed by changing the scent itself, and/or by changing the concentration of the scent.

The sound selection module 76 can be replaced with or further include a scent selection module. The scent selection module can, for example, select a scent to be disbursed via the scent system 41. Much like the sound 38 disbursed in the interior portion 14, the scent disbursed via the scent system 41 can be disbursed while the vehicle 10 is subject to autonomous operation. The intensity can correspond to the confidence of the autonomous support systems. Accordingly, the intensity of the scent in the interior portion 14 of the vehicle 10 can change with changes in confidence in autonomous operation of the vehicle 10.

The following examples are provided to further explain the interrelation between the confidence evaluation module 72, the sound selection module 76, and the urgency determination module 78. However, it should be understood that the disclosure is not limited to these examples. Many different variations of these examples could be used in the vehicle 10 without departing from the scope of this disclosure. Furthermore, much of the same examples can be used with reference to, or further include, the other forms of feedback described herein (e.g., haptic feedback, scent, etc.).

Example 1

The vehicle 10 can travel along a roadway before sunset in the evening. As the vehicle 10 drives along the roadway, the vehicle 10 can operate autonomously in a first state (e.g., the vehicle's 10 current state of autonomy). In this example, the first state can be, for example, LEVEL 3 automation. Accordingly, autonomous driving module 62 can be in full control of the vehicle systems 16 under certain traffic and environmental conditions.

The confidence evaluation module 72 can determine that all of the sensors in the sensor system 40 supporting the autonomous operation are operating optimally. Additionally, the confidence evaluation module 72 can determine that all vehicle systems 16 supporting the autonomous operation are operating optimally. Accordingly, the confidence evaluation module 72 can determine that the vehicle 10 is operating autonomously in a fully confident manner. The confidence in the autonomous operation associated with the current state of autonomy can be, for example, 100%.

The sound selection module 76 can receive the confidence from the confidence evaluation module 72 associated with the current state of autonomy. Since the confidence is 100%, the sound selection module 76 can select a sound from the sound database 74 that has a low intensity, and operate the speaker system 37 to disburse the selected sound as sound 38 in the interior portion 14 of the vehicle 10. The selected sound, and accordingly the sound 38, could be a low pitch "hum," an infrequent (i.e., low-tempo) low-volume tone, etc.

The vehicle 10 can continue to travel as the sun sets. Accordingly, one of the sensors, the camera(s) 54, is not be able to operate optimally (since it is dark out). The confidence evaluation module 72 detects that the camera(s) 54 are unable to operate optimally, and, as such, determines a new confidence associated with the current state of autonomy. The confidence associated with the current state of autonomy can now be, for example, 95%.

The urgency determination module 78 can detect the change to the confidence. In this example, the urgency determination module 78 detects that the previously determined confidence (100%) has dropped 5%. However, the urgency determination module 78 determines that the current confidence (95%) is still greater than the threshold confidence for the LEVEL 3 automation (75%, for example). Accordingly, the urgency determination module 78 determines that there is only a minor, insignificant change to the confidence and, as such, there is only a minor need to apprise the driver 32 of the change to the confidence.

The sound selection module 76 can be in communication with the urgency determination module 78. Based on the 5% drop in confidence from 100%, the sound selection module 76 can select a different, higher intensity sound than the first sound selected. Based on the current 95% confidence, the sound selection module can select, for example, a slightly higher pitch "hum", a slightly higher tempo low-volume tone, etc. Accordingly, the second sound selected by the sound selection module 76 and disbursed as sound 38 by the speaker system 37 is slightly more intense than the first sound selected. The second sound selected corresponds to the second determined confidence (95%), and the first sound selected corresponds to the first determined confidence (100%).

Example 2

The vehicle 10 can travel along a roadway in a mountain range. As the vehicle 10 drives along the roadway, the vehicle 10 can operate autonomously in a first state. In this example, the first state can be, for example, LEVEL 2 automation. Accordingly, autonomous driving module 62 can operate two or more of the vehicle systems 16 in unison. For example the autonomous driving module 62 can control the vehicle's steering system 26, propulsion system 18, braking system 24, etc. (e.g., lane centering with adaptive cruise control is currently enabled).

The confidence evaluation module 72 can determine that all of the sensors in the sensor system 40 supporting autonomous operation are operating optimally, except for sonar sensor(s) 50 (which are not working optimally due to high roadway noise), camera(s) 54 (which are not working optimally due to occlusions), and positioning sensor(s) 52 (which are not working optimally due to the vehicle 10 being in a mountain range). Additionally, the confidence evaluation module 72 can determine that all vehicle systems 16 supporting autonomous operation are operating optimally. Accordingly, the confidence evaluation module 72 can determine that the vehicle 10 is operating in a semi-confident manner. The confidence in the autonomous operation associated with the current operating state can be, for example, 70%.

The sound selection module 76 can receive the confidence from the confidence evaluation module 72 associated with the current state. Since the confidence is 70%, the sound selection module 76 can select a sound that has a medium intensity. In this example, the sound selection module 76 can select a sound detected by the microphone(s) 44 (e.g., road noise). The sound selection module 76 can operate the speaker system 37 to disburse the selected sound as sound 38 in the interior portion 14 of the vehicle 10. The selected sound, and accordingly the sound 38, can be amplified to a first volume corresponding to the 70% confidence determined by the confidence evaluation module 72.

The urgency determination module 78 can compare the current confidence (70%) to the threshold confidence for the LEVEL 2 automation (60%). Since the current confidence is greater than the threshold confidence, the urgency determination module 78 can determine the vehicle 10 can continue to operate in the current state of autonomy.

The vehicle 10 can continue to operate in the current state of autonomy when the vehicle 10 exits the mountain range. Accordingly, one of the sensors supporting autonomous operation, the positioning sensor(s) 52, is now able to operate optimally. The confidence evaluation module 72 detects the positioning sensor(s) 52 are now operating optimally, and, as such, determines a new confidence associated with the current state of autonomy. The confidence associated with the current state of autonomy can now be, for example, 80%.

The urgency determination module 78 can detect the change to the confidence. In this example, the urgency determination module 78 detects the original confidence (70%) has increased by 10%. The urgency determination module 78 determines the current confidence (80%) is still greater than the threshold confidence for the LEVEL 2 automation (60%). In one or more arrangements, the urgency determination module 78 can determine the current confidence (80%) is equal to LEVEL 3 threshold confidence. Accordingly, the urgency determination module 78 can alert the driver 32 of (and/or automatically switch to) an available higher level of autonomy.

The sound selection module 76 can be in communication with the urgency determination module 78. Based on the 10% increase in confidence to 80%, the sound selection module 76 can select a different, lower volume from the first sound selected. Based on the 80% confidence, the sound selection module can amplify the detected road noise to a second volume being lower than the first volume. Accordingly, the sound amplified to the second volume by the sound selection module 76 and disbursed as sound 38 by the speaker system 37 is less intense than the first sound amplified and disbursed. The second volume corresponds to the second determined confidence (80%), and the first volume corresponds to the first determined confidence (70%). Additionally, the sound selection module 76 can notify the driver of the availability of a higher level of autonomy based on the change in confidence. The sound selection module 76 can operate the speaker system 37 to disburse an additional sound different from the road noise in the interior portion 14 of the vehicle 10 to notify the driver 32 of the availability of (or the vehicle 10 transitioning to) LEVEL 3 automation.

Example 3

The vehicle 10 can travel along a roadway before a construction zone. As the vehicle 10 drives along the roadway, the vehicle 10 can operate autonomously in a first state. In this example, the first state can be, for example, LEVEL 3 automation. Accordingly, autonomous driving module 62 can be in full control of the vehicle systems 16 under certain traffic or environmental conditions.

The confidence evaluation module 72 can determine that all of the sensors in the sensor system 40 supporting the autonomous operation are operating optimally. Additionally, the confidence evaluation module 72 can determine that all vehicle systems 16 supporting the autonomous operation are operating optimally as well. Accordingly, the confidence evaluation module 72 can determine that the vehicle 10 is operating autonomously in a fully confident manner. The confidence associated with the current operating state can be, for example, 100%.

The sound selection module 76 can receive the confidence from the confidence evaluation module 72 associated with the current state of autonomy. The sound selection module 76 can select a sound from the audio/video system 30 at a low intensity. The sound selection module 76 can operate the speaker system 37 to disburse the selected sound as sound 38 in the interior portion 14 of the vehicle 10. The sound selected, and accordingly the sound 38, could be the normal pitch (e.g., the same pitch as the sound in the audio/video system 38), the volume selected by the driver, etc.

The vehicle 10 can continue to travel and approach the construction zone. Accordingly, all of the sensors are still operable, but a condition (the location of the vehicle 10) is occurring such that the vehicle 10 may no longer be able to operate in the current state of autonomy (due to a LEVEL 3 limitation of operation in construction zones). The confidence evaluation module 72 detects that the vehicle's 10 location is approaching a construction zone and, as such, determines the confidence in the current state of autonomy based on the vehicle's 10 location. The confidence associated with the current state of autonomy can now be, for example, 95%. The confidence can further decrease as the vehicle 10 approaches the construction zone.

The urgency determination module 78 can detect the first change to the confidence. In this example, the urgency determination module 78 detects that the previously determined confidence (100%) has dropped 5%. However, the urgency determination module 78 determines that the current confidence (95%) is still greater than the threshold confidence for the LEVEL 3 state of autonomy (75%). Accordingly, the urgency determination module 78 determines that there is only a minor change in confidence and, as such, there is only a minor need to alert the driver 32. However, the urgency determination module 78 detects second change to the confidence, where the previously determined confidence (95%) has dropped another 5%. This change over time can indicate that the vehicle 10 will continue to lose confidence in the current state of autonomy. The urgency determination module 78 can detect the change in the confidence over time, and communicate with the confidence evaluation module 72 to determine the cause of the changes in confidence. The urgency determination module 78, in conjunction with the confidence evaluation module 72, can determine that a transition to a different state of autonomy (e.g., LEVEL 2 automation) is impending due to the vehicle 10 approaching the construction zone.

The sound selection module 76 can be in communication with the urgency determination module 78. Based on the 10% drop in confidence from 100%, the sound selection module 76 can select, for example, a different sound having a different intensity. Based on the impending level change, the sound selection module can operate the speaker system 37 to lower, for example, the volume of the sound 38 received from the audio/video system 30, and, at the same time, disburse the different sound 38 that has, for example, increasing intensity over time. In this example, the sound selection module 76 can lower the volume of the first selected sound as the vehicle 10 approaches the construction zone. Additionally, the sound selection module 76 can increase the intensity of the second sound 38 as the vehicle approaches the construction zone. The selected sound, and accordingly the sound 38, could be an increasingly higher pitch "ping", an increasingly frequent (e.g., increasing the tempo over time) tone, etc., while the sound selected at the 100% confidence (e.g., the sound from the audio/video system 30) can have a lower volume over time. Accordingly, the sound selected by the sound selection module 76, and the sound 38 disbursed by the speaker system 37 is more intense over time. In this example, the intensity of the selected sound is a function of the vehicle's location as it approaches the construction zone.

Although the previous examples have been presented, many variations of the preceding examples can be used in the vehicle 10, including different patterns of sounds, different changes in confidence, different transitions between levels, etc. Accordingly, the present disclosure should not be limited to the examples presented, and encompasses all the variations of such examples as would be generally understood in the art.

Now that the various potential systems, devices, elements and/or components of the vehicle 10 have been described, various methods will now be described. Referring now to FIG. 2, a flow chart showing an example of a method for apprising a driver of a confidence associated with a state of autonomy. Various possible steps of method 100 will now be described. The method 100 illustrated in FIG. 2 may be applicable to the arrangements described above in relation to FIG. 1, but it is understood that the method 100 can be carried out with other suitable systems and arrangements. Moreover, the method 100 may include other steps that are not shown here, and in fact, the method 100 is not limited to including every step shown in FIG. 2. The steps that are illustrated here as part of the method 100 are not limited to this particular chronological order. Indeed, some of the steps may be performed in a different order than what is shown and/or at least some of the steps shown can occur simultaneously.

The method 100 starts at function block 102. The method 100 proceeds to function block 104.

At function block 104, the vehicle 10 identifies whether it is in autonomous operation. For example, the confidence evaluation module 72 can identify the vehicle 10 operating in a current state of autonomy. As previously stated, the current state of autonomy can be, for example, a level as described by the NHTSA publication. Additionally or alternatively, the current state of autonomy can be any way of categorizing or characterizing various levels of autonomy that the vehicle 10 can be operated in. If the vehicle 10 is not subject to autonomous operation, the method 100 can proceed to function block 116, where the method 100 ends. However, if the vehicle 10 is subject to autonomous operation, the method can continue to function block 106.

At function block 106, the confidence evaluation module 72 can determine a confidence corresponding to the current state of autonomy detected in function block 104. The confidence determined by the confidence evaluation module 72 can be based on the operational statuses of the autonomous support systems. The method 100 can proceed to function block 108.

At function block 108, the confidence evaluation module 72 determines whether there was a previous determination of the confidence in the autonomous operation of the vehicle 10. Generally speaking, at function block 108, the confidence evaluation module 72 determines whether this is the first iteration of the method 100, or whether there were previous iterations. If there was a previous determination of the confidence in the autonomous operation of the vehicle 10, the method can proceed to function block 110. However, if there was not a previous determination of the confidence in autonomous operation (i.e., this is the first iteration), the method 100 can proceed directly to function block 114.

At function block 110, the confidence evaluation module 72 determines whether there has been a change in confidence between the determined confidence (at function block 106) and the previous determination of the confidence (in the previous iteration). If there was not a change in confidence, the method 100 continues back to function block 102. However, if there was a change in confidence, the method 100 continues to function block 112.

At function block 112, the confidence evaluation module 72 updates the confidence in the autonomous operation. The method 100 continues to function block 114.

At function block 114, feedback is disbursed in the interior portion 14 of the vehicle 10. The feedback corresponds to autonomous operation of the vehicle 10. The feedback apprises the driver of the confidence in the autonomous operation of the vehicle 10.

Such feedback can include sound 38. The sound selection module 76 can operate the speakers 37 to disburse sound 38 in the interior portion 14 of the vehicle 10. The sound selected by the sound selection module 76 can include for example, an ambient sound detected by the microphone 44. In another example, the sound selected by the sound selection module 76 can be from the audio/video system 30. In another example, the sound selected by the sound selection module 76 can be a sound stored on the sound database 74. The sound selected by the sound selection module 76, and accordingly the sound 38, can correspond to the confidence in the autonomous operation of the vehicle 10. The sound selected by the sound selection module 76, and accordingly the sound 38, can have an intensity corresponding to the confidence in the autonomous operation of the vehicle 10.

Such feedback can include haptic feedback. The signal selection module can send a signal to the haptic system 39 to disburse haptic feedback in the interior portion 14 of the vehicle 10. The signal selected or generated by the signal selection module can change over time with changes in confidence. The signal selected or generated by the signal selection module can correspond to the confidence in the autonomous operation of the vehicle 10. The signal selected or generated by the signal selection module can have an intensity corresponding to the confidence in the autonomous operation of the vehicle 10. The haptic feedback generated by the haptic system 39 can change over time with changes in confidence.

Such feedback can include a scent. The scent selection module can select a scent to be disbursed, via the scent system 41, in the interior portion 14 of the vehicle 10. The scent itself, and/or the concentration of the scent, can change over time with changes in confidence. The scent in the interior portion 14 of the vehicle 10 can correspond to the confidence in the autonomous operation of the vehicle 10. The scent can have an intensity corresponding to the confidence in the autonomous operation of the vehicle 10.

As shown in FIG. 2, the method 100 continues through multiple iterations while the vehicle 10 is subject to autonomous operation. Accordingly, a sound 38 or other feedback is disbursed or otherwise provided in the interior portion 14 of the vehicle 10 while the vehicle 10 is subject to autonomous operation, with the sound 38 or other feedback corresponding to the confidence in autonomous operation determined by the confidence evaluation module 72.

It will be appreciated that arrangements described herein can provide numerous benefits, including one or more of the benefits mentioned herein. For example, arrangements described herein can constantly apprise a driver of a confidence associated with a current state of autonomy for his or her vehicle. Arrangements described herein can apprise a driver of an impending change in state of autonomy. Arrangements described herein permit a driver to understand the current conditions that the vehicle is operating at regardless of what he or she is currently viewing.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A vehicle subject to autonomous operation, comprising:
   one or more autonomous support systems configured to support autonomous operation;
   a speaker system configured to disburse sound in an interior portion of the vehicle; and
   a confidence appraisal system in communication with the one or more autonomous support systems and the speaker system, the confidence appraisal system including a processor for initiating instructions stored on memory, the instructions including, while the vehicle is subject to autonomous operation supported by the one or more autonomous support systems:
      monitoring confidence in the autonomous operation, the confidence being determined based on operational statues of the one or more autonomous support systems supporting the autonomous operation, and corresponding to whether the vehicle can continue the autonomous operation; and
      operating the speaker system to disburse sound in the interior portion of the vehicle, the sound corresponding to the confidence in the autonomous operation, and varying with changes to the confidence in the autonomous operation, to continuously apprise a driver of the confidence in the autonomous operation.

2. The vehicle of claim 1, wherein the sound has an intensity corresponding to the confidence in the autonomous operation, and varies in intensity with changes to the confidence in the autonomous operation, to continuously apprise the driver of the confidence in the autonomous operation.

3. The vehicle of claim 2, wherein the sound's intensity increases with decreases to the confidence in the autonomous operation, and decreases with increases to the confidence in the autonomous operation.

4. The vehicle of claim 2, wherein the sound includes a temporal string of tones, and varies in intensity via variations to one or more of a pitch, loudness and tempo of the sound's tones with changes to the confidence in the autonomous operation, to continuously apprise the driver of the confidence in the autonomous operation.

5. The vehicle of claim 4, wherein the sound varies in intensity via variations to the pitch of the sound's tones, but otherwise stays the same, with changes to the confidence in the autonomous operation, to continuously apprise the driver of the confidence in the autonomous operation.

6. The vehicle of claim 4, wherein the sound varies in intensity via variations to the loudness of the sound's tones, but otherwise stays the same, with changes to the confidence in the autonomous operation, to continuously apprise the driver of the confidence in the autonomous operation.

7. The vehicle of claim 4, wherein the sound varies in intensity via variations to the tempo of the sound's tones, but otherwise stays the same, with changes to the confidence in the autonomous operation, to continuously apprise the driver of the confidence in the autonomous operation.

8. The vehicle of claim 4, wherein the sound's tones express music.

9. The vehicle of claim 4, wherein the sound's tones express ambient noise.

10. The vehicle of claim 1, wherein the instructions further include, while the vehicle is subject to autonomous operation supported by the one or more autonomous support systems:
   identifying a change to the confidence indicating a forthcoming change from a first state of autonomy to which the vehicle is currently subject, to a second state of autonomy; and
   apprising the driver of the forthcoming change to the second state of autonomy.

11. The vehicle of claim 10, wherein the instructions further include:
   transitioning the vehicle from the first state of autonomy to the second state of autonomy.

12. A method of apprising a driver of a confidence in autonomous operation of a vehicle, comprising:
   while a vehicle is subject to autonomous operation supported by one or more autonomous support systems:
      monitoring confidence in the autonomous operation, the confidence being determined based on operational statues of the one or more autonomous support systems supporting the autonomous operation, and corresponding to whether the vehicle can continue the autonomous operation; and
      operating a feedback system to provide feedback in an interior portion of the vehicle, the feedback corresponding to the confidence in the autonomous operation, and varying with changes to the confidence in the autonomous operation, to continuously apprise a driver of the confidence in the autonomous operation.

13. The method of claim 12, wherein the feedback is sound, and the sound has an intensity corresponding to the confidence in the autonomous operation, and the method further comprises:
   varying the intensity of the sound with changes to the confidence in the autonomous operation, to continuously apprise the driver of the confidence in the autonomous operation.

14. The method of claim 13, wherein the sound's intensity increases with decreases to the confidence in the autonomous operation, and decreases with increases to the confidence in the autonomous operation.

15. The method of claim 13, wherein the sound includes a temporal string of tones, and varies in intensity via variations to one or more of a pitch, loudness and tempo of the sound's tones with changes to the confidence in the autonomous operation, to continuously apprise the driver of the confidence in the autonomous operation.

16. The method of claim 15, wherein the sound varies in intensity via variations to the pitch of the sound's tones, but otherwise stays the same, with changes to the confidence in the autonomous operation, to continuously apprise the driver of the confidence in the autonomous operation.

17. The method of claim 15, wherein the sound varies in intensity via variations to the loudness of the sound's tones, but otherwise stays the same, with changes to the confidence in the autonomous operation, to continuously apprise the driver of the confidence in the autonomous operation.

18. The method of claim 15, wherein the sound varies in intensity via variations to the tempo of the sound's tones, but otherwise stays the same, with changes to the confidence in the autonomous operation, to continuously apprise the driver of the confidence in the autonomous operation.

19. The method of claim 12, further comprising:
   identifying a change to the confidence indicating a forthcoming change from a first state of autonomy to which the vehicle is currently subject, to a second state of autonomy; and
   apprising the driver of the forthcoming change to the second state of autonomy.

20. The method of claim 19, further comprising:
   transitioning the vehicle from the first state of autonomy to the second state of autonomy.

21. The method of claim 12, wherein the feedback is haptic feedback, the haptic feedback having an intensity corresponding to the confidence in the autonomous operation, and the method further comprises:
   varying the intensity of the haptic feedback with changes to the confidence in the autonomous operation, to continuously apprise the driver of the confidence in the autonomous operation.

22. The method of claim 12, wherein the feedback is a scent in the interior portion of the vehicle, the scent in the interior portion of the vehicle has an intensity corresponding to the confidence in the autonomous operation, and the method further comprises:
   varying the intensity of the scent in the interior portion of the vehicle with changes to the confidence in the autonomous operation, to continuously apprise the driver of the confidence in the autonomous operation.

* * * * *